(12) United States Patent
Siemens et al.

(10) Patent No.: US 11,240,355 B2
(45) Date of Patent: Feb. 1, 2022

(54) PLATFORM AGNOSTIC ABSTRACTION FOR FORWARDING EQUIVALENCE CLASSES WITH HIERARCHY

(71) Applicant: Arista Networks, Inc., Santa Clara, CA (US)

(72) Inventors: Trevor A. W. Siemens, Coquitlam (CA); Mayukh Saubhasik, Richmond (CA)

(73) Assignee: Arista Networks, Inc., Santa Clara, CA (US)

( * ) Notice: Subject to any disclaimer, the term of this patent is extended or adjusted under 35 U.S.C. 154(b) by 438 days.

(21) Appl. No.: 16/415,694

(22) Filed: May 17, 2019

(65) Prior Publication Data

US 2020/0366768 A1 Nov. 19, 2020

(51) Int. Cl.
*H04L 29/08* (2006.01)
*H04L 12/879* (2013.01)

(52) U.S. Cl.
CPC .......... *H04L 69/324* (2013.01); *H04L 49/901* (2013.01)

(58) Field of Classification Search
None
See application file for complete search history.

(56) References Cited

U.S. PATENT DOCUMENTS

| 7,609,637 | B2 | 10/2009 | Doshi |
| 8,365,034 | B2 | 1/2013 | Kim |
| 9,712,447 | B2 | 7/2017 | Wood et al. |
| 2010/0293327 | A1* | 11/2010 | Lin .................... H04L 45/7457 711/108 |
| 2016/0294693 | A1* | 10/2016 | Cheng .................. H04L 45/745 |
| 2018/0026880 | A1 | 1/2018 | Nainar et al. |

OTHER PUBLICATIONS

Saha, Dola, et al, GRATIS: Free Bits In The Network; CU-CS-1075-10, GRATIS: Free Bits In The Network; CU-CS-1075-10, 24.

* cited by examiner

*Primary Examiner* — Robert M Morlan
(74) *Attorney, Agent, or Firm* — Chamberlain, Hrdlicka, White, Williams & Aughhy (57) ABSTRACT

Methods, systems, and computer-readable mediums for managing forwarding equivalence class (FEC) hierarchies, including obtaining a forwarding equivalence class (FEC) hierarchy; making a first determination that a first hardware component supports a maximum levels of indirection (MLI) quantity; making a second determination that the FEC hierarchy has a hierarchy height; based on the first determination and the second determination, performing a comparison between the MLI quantity and the hierarchy height to obtain a comparison result; and based on the comparison result, performing a FEC hierarchy action set.

20 Claims, 5 Drawing Sheets

| Flattened FEC Hierarchy Table 500 ||
|:---:|:---:|
| FEC | Pointers, Actions, Information |
| FEC A | Combined F and G actions; J pointer |
| FEC G | J pointer |
| FEC J | Port A |
| FEC B | G actions; J pointer |
| FEC C | H actions; J pointer |
| FEC H | J pointer |
| FEC D | I actions; K pointer |
| FEC I | K pointer |
| FEC K | Port B |
| FEC E | I actions; K pointer |

FIG. 5

PLATFORM AGNOSTIC ABSTRACTION FOR FORWARDING EQUIVALENCE CLASSES WITH HIERARCHY

BACKGROUND

Network devices receive network traffic data units (e.g., packets, frames, etc.), which may be grouped as part of a forwarding equivalence class (FEC). A FEC may be associated with one or more items of information (e.g., an egress interface out of which to send the network traffic data unit, whether a network traffic data unit should be encapsulated, etc.), which may be used, for example, when making decisions related to forwarding a network traffic data unit. Network devices, and/or hardware components therein, may have varying amounts of support for aspects of implementing the use of FECs.

SUMMARY

In general, in one aspect, embodiments described herein relate to a method. The method may include obtaining a forwarding equivalence class (FEC) hierarchy; making a first determination that a first hardware component supports a maximum levels of indirection (MLI) quantity; making a second determination that the FEC hierarchy has a hierarchy height; based on the first determination and the second determination, performing a comparison between the MLI quantity and the hierarchy height to obtain a comparison result; and based on the comparison result, performing a FEC hierarchy action set.

In general, in one aspect, embodiments described herein relate to a non-transitory computer readable medium that includes instructions which, when executed by a processor, perform a method. The method may include obtaining a forwarding equivalence class (FEC) hierarchy; making a first determination that a first hardware component supports a maximum levels of indirection (MLI) quantity; making a second determination that the FEC hierarchy has a hierarchy height; based on the first determination and the second determination, performing a comparison between the MLI quantity and the hierarchy height to obtain a comparison result; and based on the comparison result, performing a FEC hierarchy action set.

Other aspects of embodiments described herein will be apparent from the following description and the appended claims.

DETAILED DESCRIPTION

Specific embodiments will now be described with reference to the accompanying figures. In the following description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods and systems for, if necessary, flattening forwarding equivalence class (FEC) hierarchies. Specifically, in one or more embodiments, obtained FEC hierarchies are assessed to determine their hierarchy height. In one or more embodiments, the hierarchy height of a given FEC hierarchy is then compared with a maximum levels of indirection (MLI) quantity supported by a network device and/or any hardware components therein. In one or more embodiments, if a hierarchy height of a FEC is less than or equal to a supported MLI quantity, the FEC hierarchy may be programmed to a hardware component without flattening. In one or more embodiments, if the hierarchy height is greater than a supported MLI quantity, then a FEC hierarchy flattening action set is performed. In one or more embodiments, a FEC hierarchy flattening action set causes a reduction in the hierarchy height (i.e., the quantity of levels of indirection in the hierarchy) from the original hierarchy height to a hierarchy height that is supported by the network device or hardware component to which the flattened FEC hierarchy is to be programmed.

Figure 1:
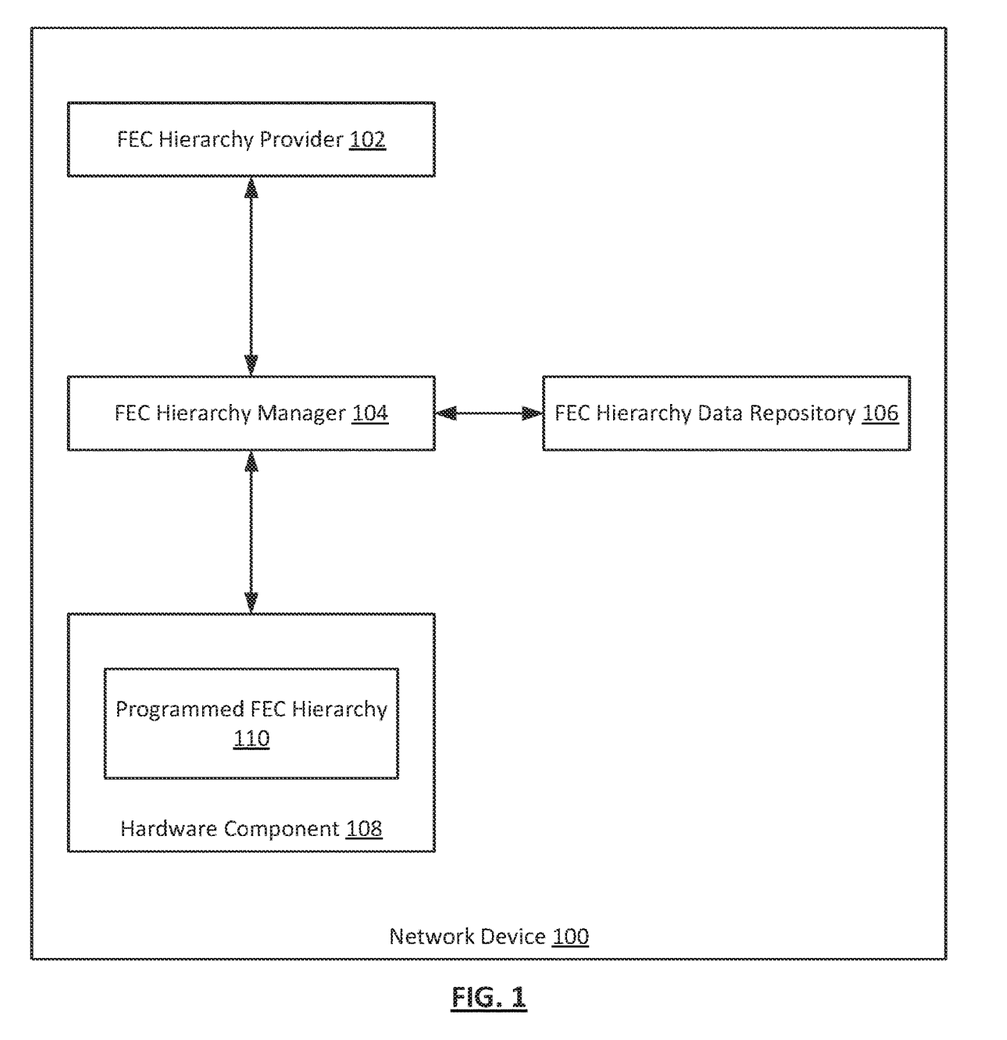
FIG. 1 shows a system in accordance with one or more embodiments described herein.

FIG. 1 shows a network device in accordance with one or more embodiments described herein. As shown in FIG. 1, the network device (100) includes a FEC hierarchy provider (102), a FEC hierarchy manager (104), a FEC hierarchy data repository (106), and at least one hardware component (108). A hardware component (108) may include a programmed FEC hierarchy (110). Each of these components is described below.

In one or more embodiments, a network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (100) include, but are not limited to, a network switch, a router, a multilayer switch, a fibre channel device, an InfiniBand® device, etc. A network device (100) is not limited to the aforementioned specific examples.

In one or more embodiments, a network device (100) includes functionality to receive network traffic data units (e.g., frames, packets, tunneling protocol frames, etc.) at any of the physical network interfaces (i.e., ports) of the network device (100) and to process the network traffic data units. In one or more embodiments, processing a network traffic data unit includes, but is not limited to, a series of one or more table lookups (e.g., longest prefix match (LPM) lookups, FEC lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the network traffic data unit; and/or (iii) determine how to route/forward the network traffic data unit in order to transmit the network traffic data unit from an interface of the network device (100). One or more actions to be taken with regards to a received network traffic data unit may be obtained by a network device based on the network traffic data unit being recognized as falling within a FEC, which may have one or more associated actions and/or items of information relevant to processing the network traffic data unit (e.g., label switched path protocol actions, multipath information, egress interface information, etc.).

In one or more embodiments, a network device also includes and/or is operatively connected to device storage and/or device memory (i.e., non-transitory computer readable mediums) storing software and/or firmware.

Such software and/or firmware may include instructions which, when executed by the one or more processors (not shown) of a network device (100), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100)) that facilitate network connectivity for one or more operatively connected devices (e.g., computing devices, data storage devices, other network devices, etc.). In one or more embodiments, the network device (100) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, a network device (100) includes and/or is operatively connected to a FEC hierarchy provider (102). In one or more embodiments, a FEC hierarchy provider (102) is hardware (e.g., circuitry) and/or a combination of hardware and software that includes functionality including, but not limited to, providing a FEC hierarchy. In one or more embodiments, a FEC hierarchy includes a set of FEC entries. A FEC entry may include information relating to actions to be performed upon receipt of a network traffic data unit having one or more characteristics (e.g., destination address, source address, etc.) that identify the network traffic data unit as being within a FEC. Such information/actions may include, but are not limited to: identification of an egress interface out of which the network traffic data unit is to be forwarded to a next-hop device; adding a Multiprotocol Label Switching (MPLS) label; rewriting source or destination media access control (MAC) header information; encapsulating the network traffic data unit in accordance with a tunneling protocol (e.g., Virtual eXtensible Local Area Network (VXLAN)) header; etc.

Additionally, a FEC entry in a FEC hierarchy may include a pointer to another FEC. As used herein, the term 'pointer' may refer to any type of information in a FEC entry identifying another FEC, which may be a lower-level FEC, thereby signifying that a link exists between the FEC of the FEC entry and the other FEC identified therein. In one or more embodiments, a FEC entry that includes identifying information for a given FEC and a pointer to another FEC adds a level of indirection to a FEC hierarchy. A chain of such entries, in which one FEC points to another FEC, which points to another FEC, etc., may have a number of levels of indirection. For a given FEC hierarchy, the one or more FEC entries with the largest number of levels of indirection may define a hierarchy height of the FEC hierarchy. A FEC hierarchy may include any number of levels of indirection, and, thus, may have any hierarchy height.

In one or more embodiments, a FEC hierarchy provider (104) may be platform agnostic, meaning that the FEC hierarchy provider (104) may not need to take into account the capabilities of the underlying hardware into which a FEC hierarchy is to be programmed. Accordingly, in one or more embodiments, a FEC hierarchy provider (104) may provide any FEC hierarchy that is deemed the most desirable based on any parameters available to the FEC hierarchy provider. In one or more embodiments, not having to account for hardware capabilities may reduce the required complexity of executing a FEC hierarchy provider (104).

In one or more embodiments, a given FEC entry may include a pointer to another FEC as well as additional information and/or actions. In one or more embodiments, any number of higher-level FEC entries in a FEC hierarchy may include pointers to the same lower-level FEC. For example, a bottom-level FEC entry in a FEC hierarchy, which may also be referred to as a leaf FEC entry, may include an egress interface associated with the bottom-level FEC, and twenty-seven FEC entries in the next higher level of the FEC hierarchy may include a pointer to the bottom-level FEC. Such a FEC hierarchy may, for example, allow for more expedient convergence of a FEC table because if the egress of interface for the bottom-level FEC changes, only the one entry for the bottom-level FEC needs to be updated. The twenty-seven higher-level FEC entries may remain the same, as they still point to the bottom-level FEC. In one or more embodiments, a FEC hierarchy may also reduce hardware storage requirements when using FECs, as a smaller set of information may be stored to facilitate the actions relating to FECs.

In one or more embodiments, a FEC hierarchy provider (102) may be any type of entity that seeks to utilize a FEC hierarchy to perform certain functionality. For example, a FEC hierarchy provider (102) may be a software agent executing using hardware resources of a network device (100) to implement, at least in part, the Boarder Gateway Protocol (BGP) for the network device, and, as such, may generate a FEC hierarchy to implement BGP related routing functionality on the network device (100). Other examples of protocols or network implementation schemes that may use a FEC hierarchy include, but are not limited to, MPLS, equal cost multi-path (ECMP), Open Shortest Path First (OSPF), etc.

In one or more embodiments, a network device (100) includes and/or is operatively connected to a FEC hierarchy manager (104). In one or more embodiments, a FEC hierarchy manager (104) is hardware (e.g., circuitry) and/or a combination of hardware and software that includes functionality including, but not limited to, determining whether a FEC hierarchy obtained from a FEC hierarchy provider (102) should be flattened, in whole or in part, based on capabilities of a hardware component (108) into which a FEC hierarchy is to be programmed.

In one or more embodiments, flattening a FEC hierarchy is reducing, if necessary, the number of levels of indirection present in the FEC hierarchy, thereby reducing the hierarchy height. Such flattening may occur so that the hierarchy height is equal to or less than what a network device and/or hardware component therein is capable of supporting which, as discussed above, may be referred to as an MLI quantity of a network device or hardware component therein. FEC hierarchy flattening is discussed further in the description of FIG. 2, below.

In one or more embodiments, a FEC hierarchy manager (104) is operatively connected to a FEC hierarchy provider (102). For example, a data path may exist between a FEC hierarchy provider (102) and a FEC hierarchy manager (104) that uses shared memory (not shown) as the mechanism by which the FEC hierarchy manager (104) obtains a FEC hierarchy from a FEC hierarchy provider (102). In one or more embodiments, a FEC hierarchy manager includes software executing on hardware of the network device, and logically exists within a hardware abstraction layer such that it provides the capability of programming (or causing the programming of) FEC hierarchies from FEC hierarchy providers to one or more hardware components (e.g., hardware component (108)).

In one or more embodiments, a FEC hierarchy manager (104) is operatively connected to a FEC hierarchy data repository (106). In one or more embodiments, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments, a FEC hierarchy data repository (106) includes functionality to store data that may be used by a FEC hierarchy manager (104) when performing FEC flattening and/or programming actions.

For example, if a FEC hierarchy has previously been flattened to meet the capabilities of a first hardware component of a network device (100), then the hierarchy height of the flattened FEC hierarchy may be stored. In such an example, if another hardware component requires the FEC hierarchy to be programmed, the FEC hierarchy manager may first check the stored hierarchy height information. In one or more embodiments, if the hierarchy height falls within the number of levels of indirection supported by the new hardware component, the FEC hierarchy manager (104) may re-use the flattened FEC hierarchy rather than re-perform the flattening actions, thereby saving time and computational load on the hardware of the network device.

In one or more embodiments, the FEC hierarchy manager is also operatively connected to at least one hardware component (108). In one or more embodiments, a hardware component (108) is any hardware (e.g., circuitry such as, for example, application specific integrated circuits (ASICs)), which may include and/or be programmed by/with software and/or firmware, that includes functionality related to receiving, processing, and/or transmitting network traffic data units in accordance with one or more embodiments described herein. In one or more embodiments, a hardware component (108) is a packet processor (e.g., a network chip), a field programmable gate array (FPGA), and/or any other component into which a flattened or unflattened FEC hierarchy may be programmed.

In one or more embodiments, the network device (100) includes any number of hardware components (108) (e.g., network chips, field programmable gate arrays (FPGAs), etc.).

In order to perform such functionality, a hardware component may include any number of sub-components (not shown). Such subcomponents may include, but are not limited to, one or more processors, one or more buffers (e.g., for implementing receive and/or transmit queues, such as virtual output queues (VOQs)), any type or amount of storage of any type for storing hardware tables (e.g., FEC tables). Such tables may control, at least in part, various aspects of the operation of a network device (100), such as functionality related to network traffic data unit forwarding, maximum transmission unit enforcement, encapsulation/decapsulation, address rewrites, etc. Examples of storage for hardware table may include, but are not limited to, tertiary content addressable memory (TCAM) and static random access memory (SRAM). A hardware component may also include and/or be operatively connected to any number of physical network interfaces of a network device (100). Such interfaces may provide a path external to the network device (e.g., to other devices), and/or may be operatively connected to other components internal to the network device (104), and each such interface may be an ingress and/or egress interface.

As a non-limiting example, a hardware component may be and/or may include an ASIC that receives network traffic data units at an ingress port and, so long as no security policy—or MTU enforcement policy associated with a FEC that a given network traffic data unit is in—indicates that the network traffic data units should be dropped, determines out of which egress port on the network device (100) to forward the network traffic data units.

In one or more embodiments, a hardware component (108) includes functionality to support any zero or more MLI quantity. In one or more embodiments, if a given hardware component only supports an MLI quantity of zero, then a FEC hierarchy from a FEC hierarchy provider must be completely flattened (i.e., all levels of indirection removed) before being programmed to the hardware component (108). In one or more embodiments, for a hardware component that supports an MLI quantity of one or more, then a FEC hierarchy from a FEC hierarchy provider must be flattened enough so that the hierarchy height of the flattened FEC hierarchy is equal to or less than the MLI quantity.

In one or more embodiments, a hardware component (108) may store a programmed FEC hierarchy (110). In one or more embodiments, a programmed FEC hierarchy (110) is a FEC hierarchy that has been programmed, directly or indirectly, by a FEC hierarchy manager (104). In one or more embodiments, a programmed FEC hierarchy (110) may or may not be flattened.

While FIG. 1 shows a configuration of components, other configurations may be used without departing from the scope embodiments described herein. For example, there may be any number of FEC hierarchy providers. As another example, there may be any number of FEC hierarchy managers. As another example, there may be any number of hardware components, software instances, etc. that are not shown in FIG. 1. Accordingly, embodiments disclosed herein should not be limited to the configuration of components shown in FIG. 1.

Figure 2:
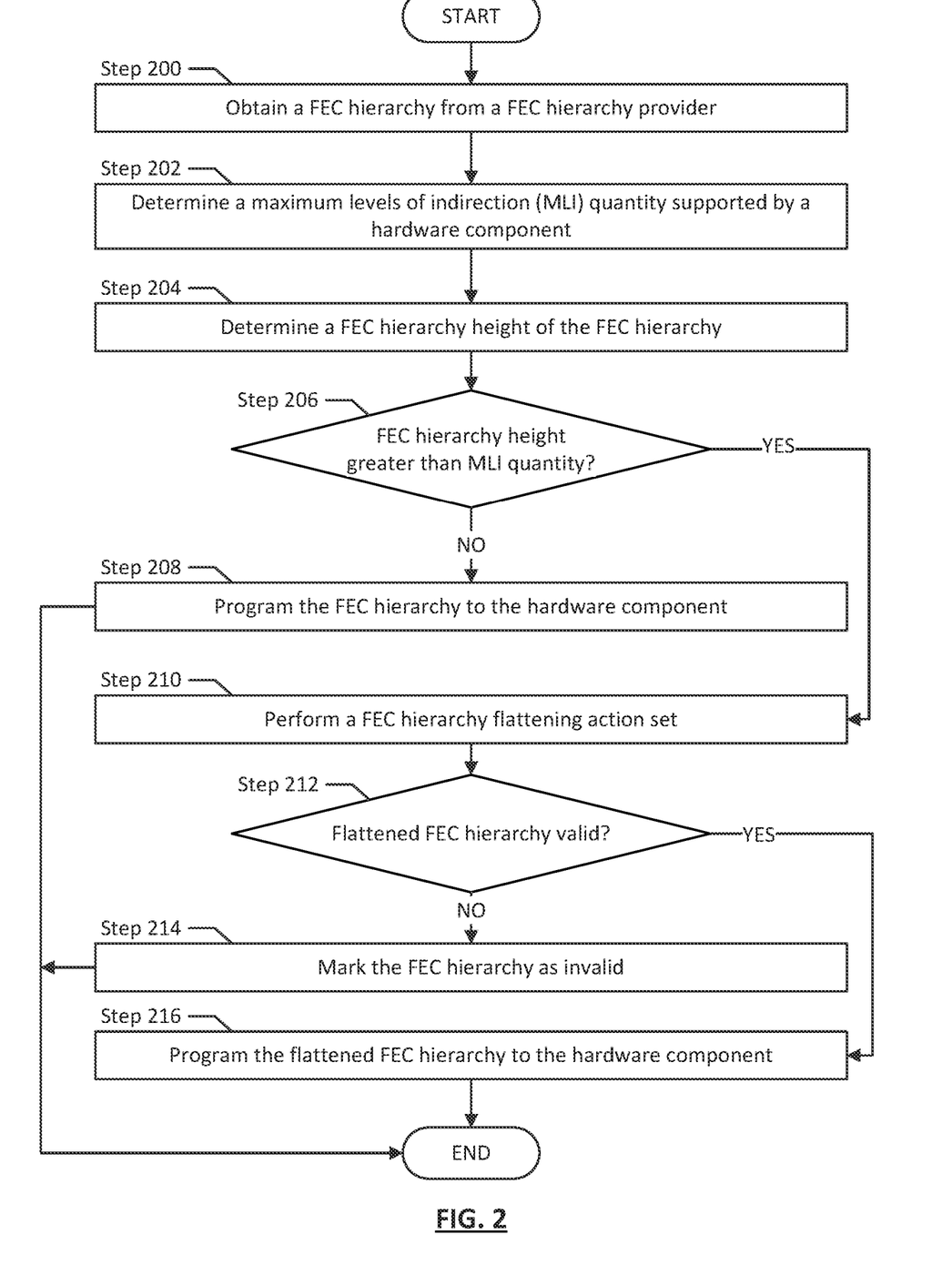
FIG. 2 shows a flowchart in accordance with one or more embodiments described herein.

FIG. 2 shows a flowchart describing a method for FEC hierarchy flattening in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a FEC hierarchy is obtained from a FEC hierarchy provider. In one or more embodiments, the FEC hierarchy is obtained by a FEC hierarchy manager. For example, the FEC hierarchy may be obtained by the FEC hierarchy manager from the FEC provider using inter-process communication. In one or more embodiments, the obtained FEC hierarchy has any number of levels of indirection and, thus, any hierarchy height. In one or more embodiments, the hierarchy height of the FEC hierarchy is determined by the FEC hierarchy provider prior to making the FEC hierarchy available to the FEC hierarchy manager.

In Step 202, an MLI quantity is determined for one or more hardware components of a network device. Although Step 202 is shown after Step 200, in one or more embodiments, the MLI quantity determination may be made prior to obtaining a FEC hierarchy. In one or more embodiments, a network device as a whole may have an MLI quantity. In such embodiments, the MLI quantity may correspond to a hardware component having the lowest MLI quantity. In other embodiments, one or more individual hardware components of a network device may have different MLI quantities. In still other embodiments, some hardware components of a network device may have the same MLI quantity while other hardware components have different MLI quantities. In one or more embodiments, the MLI quantity is determined using any method of assessing the hardware support available for one or more hardware components. For example, when a network device is powered on, MLI quantities for one or more hardware components may be ascertained and stored in a storage device accessible by a FEC hierarchy manager.

In Step 204, a hierarchy height of the FEC hierarchy obtained in Step 200 is determined. In one or more embodiments, a hierarchy height is determined by starting at the bottom of the FEC hierarchy (i.e., the level that indicates actions to be performed and/or egress ports from which to forward, but does not point to another FEC), which may be referred to as a leaf FEC entry. In one or more embodiments, the FEC hierarchy is then traversed up the hierarchy to determine the most levels of indirection present in the FEC hierarchy, which may be considered the hierarchy height of the FEC hierarchy. For example, a given FEC hierarchy may have a FEC entry that points to another FEC entry that points to another FEC entry that points to another FEC entry that points to an egress interface. Such a FEC hierarchy would have a hierarchy height of three, because the three aforementioned levels of indirection represent the most levels of indirection present in the FEC hierarchy.

In Step 206, a determination is made whether the hierarchy height determined in Step 204 is greater than the MLI quantity for any hardware component to which the FEC hierarchy is to be programmed. Such a determination may be considered a comparison and, as such, may yield a comparison result. In one or more embodiments, if the hierarchy height is less than or equal to the MLI quantity for a given hardware component, the method proceeds to Step 208. If, on the other hand, the hierarchy height is determined to be greater than the MLI quantity for a given hardware component, the method proceeds to Step 210.

In Step 208, the FEC hierarchy is programmed to one or more components of a network device. In one or more embodiments, programming a FEC hierarchy may include storing the FEC hierarchy in storage of the one or more hardware components. For example, the FEC hierarchy may be represented as a table, with entries that include a FEC associated with a pointer to another FEC, and/or any number of other actions or items of information. Such a table may, for example, be stored in a hardware table of a hardware component. In one or more embodiments, programming an unflattened FEC hierarchy may be considered part of a FEC hierarchy action set. In one or more embodiments, once the unflattened FEC hierarchy is programmed to a hardware component, the process ends.

In Step 210, based on the determination in Step 206 that the hierarchy height is greater than the MLI quantity of a given hardware component, a FEC hierarchy flattening action set is performed. In one or more embodiments, a FEC hierarchy flattening action set may be considered part of a FEC hierarchy action set. In one or more embodiments, performing a FEC hierarchy flattening action set includes examining the FEC hierarchy obtained in Step 200. In one or more embodiments, each FEC entry of the FEC hierarchy that has a number of levels of indirection from the bottom layer of the FEC hierarchy that is greater than the MLI quantity of the hardware component is identified. In one or more embodiments, for each such identified FEC entry one or more actions are performed in order to reduce the number of levels of indirection for that FEC entry. In one or more embodiments, a FEC flattening action set continues to be performed until the hierarchy height of the flattened FEC hierarchy is reduced to be equal to or less than the MLI quantity of the hardware component to which the flattened FEC hierarchy is to be programmed. Aspects of performing a FEC hierarchy flattening action set is discussed further in the description of FIG. 3, below.

In Step 212, a determination is made as to whether the flattened FEC hierarchy is a valid FEC hierarchy. In one or more embodiments, an invalid FEC hierarchy is a FEC hierarchy that results in a flattened FEC entry that includes conflicting actions. Said another way, some combinations of actions may not be supported, which may be detected, and causes the yielded flattened FEC to be rendered invalid, and must not be programmed. In one or more embodiments, if a flattened FEC hierarchy is invalid, the method proceeds to Step 214. If, on the other hand, a flattened FEC hierarchy is determined to be valid, in one or more embodiments, the method proceeds to Step 216.

In Step 214, based on the determination made in Step 212, the flattened FEC hierarchy is marked as invalid. In one or more embodiments, a flattened FEC hierarchy that is marked as invalid is not programmed to a hardware component. In one or more embodiments, once a flattened FEC hierarchy is marked as invalid, although not shown in FIG. 2, one or more actions are taken to alert other entities that the flattening did not result in a valid flattened FEC hierarchy. Such entities may include, but are not limited to, the FEC hierarchy provider from which the FEC was obtained in Step 200, another FEC hierarchy related agent executing on the network device, a network administrator, etc. In one or more embodiments, once such actions are taken, the process ends.

In Step 216, the valid flattened FEC hierarchy is programmed to one or more hardware components of one or more network devices. In one or more embodiments, performing the FEC hierarchy flattening action set results in a number of hardware programming entries. In one or more embodiments, the hardware programming entries are for leaf FEC entries, for FEC entries that had a number of levels of indirection less than or equal to the MLI quantity of a hardware component, and/or flattened FEC entries that had a number of levels of indirection greater than the MLI quantity. In one or more embodiments, each of the hardware programming entries is programmed to the hardware component directly by a FEC hierarchy manager. In other embodiments, the FEC hierarchy manager may operate in conjunction with a programming interface for a hardware component to program the hardware programming entries of the flattened FEC hierarchy. In one or more embodiments, the hierarchy height of the flattened FEC hierarchy is then stored in a storage location of the network device to expedite future flattening action sets.

Figure 3:
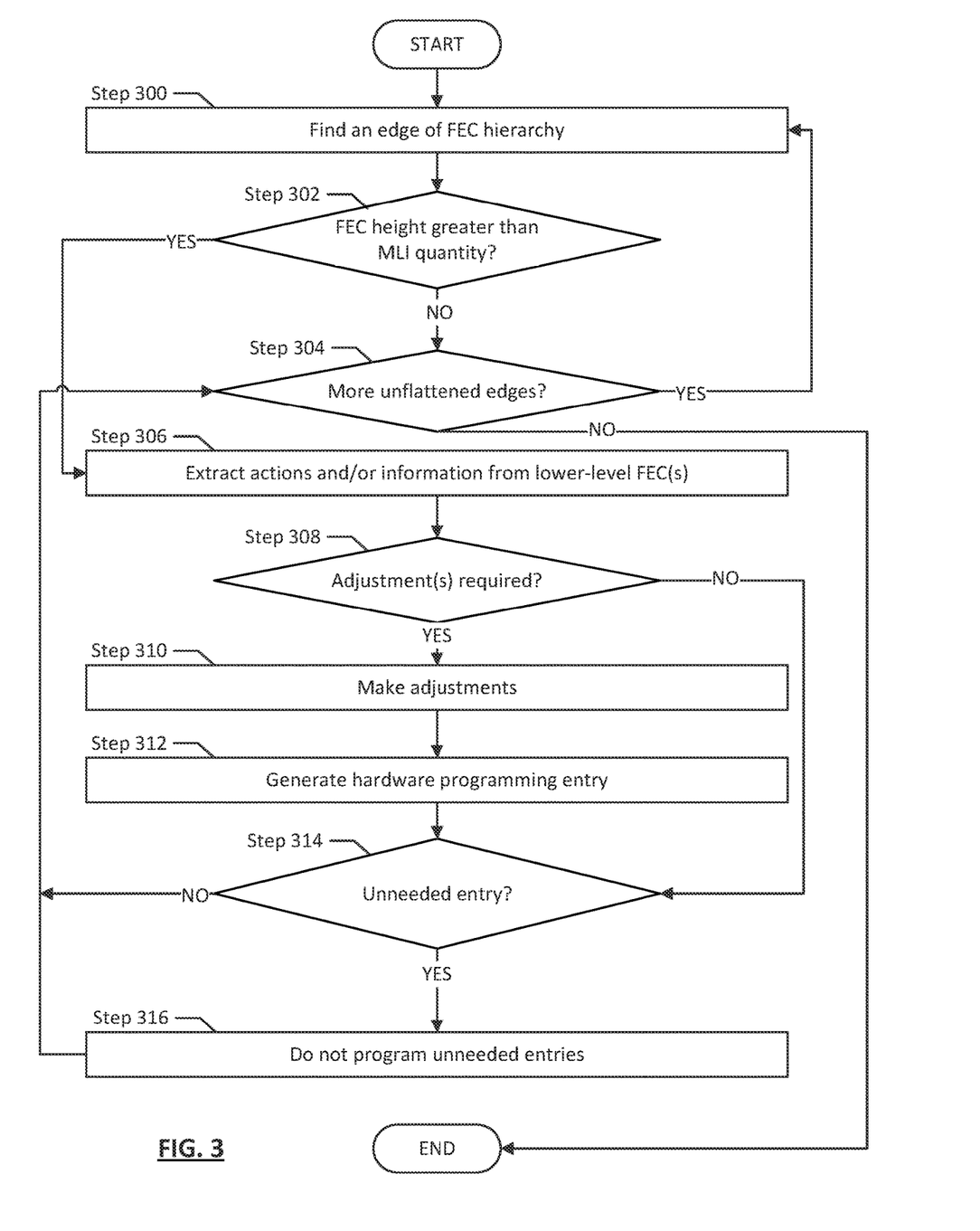
FIG. 3 shows a flowchart in accordance with one or more embodiments described herein.

FIG. 3 shows a flowchart describing a method for performing a FEC hierarchy flattening action set in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, in one or more embodiments, performing a FEC hierarchy flattening action set includes inspecting the primary FEC hierarchy being computed to find edges of the FEC hierarchy. In one or more embodiments, an edge of a FEC hierarchy is a FEC entry that is not pointed to by any higher-level FEC entry.

In Step 302, each edge FEC entry found in Step 300 is assessed to determine if the number of levels of indirection between the edge FEC entry and the bottom level of the FEC hierarchy (i.e., the 'height' of the FEC entry) is greater than the MLI quantity of the hardware component to which the flattened FEC hierarchy is to be programmed. In one or more embodiments, if the height of the FEC entry is greater than the MLI quantity, the method proceeds to Step 306. In one or more embodiments, if the FEC entry height is less than or equal to the MLI quantity, the method proceeds to Step 304.

In one or more embodiments, although not shown in FIG. 3, for an edge FEC entry of a FEC hierarchy with a number of levels of indirection less than or equal to the MLI quantity, a hardware programming entry may be created for the unflattened FEC entry, as flattening is not necessary.

In Step 304, a determination is made whether there are any other edges of the FEC hierarchy. In one or more embodiments, if there are other edges of the FEC hierarchy, the method returns to Step 300. In one or more embodiments, if there are no more edges, the method ends.

In Step 306, information and/or actions are extracted from one or more lower-level FECs and added to the hardware programming entry for the edge FEC entry. In one or more embodiments, such extraction is achieved by traveling down each edge connected to the FEC entry that has a number of levels of indirection greater than the MLI quantity, extracting relevant forwarding information (e.g., interfaces, encapsulation, etc.) from each lower-level FEC, and putting such information into a flattened version of the FEC entry. In one or more embodiments, no recursion is necessary as part of the FEC hierarchy flattening action set, because it is assumed that each visited node FEC which is not the current FEC being evaluated is itself programmable, as it has already been previously evaluated and installed, if required. In one or more embodiments, the number of lower-level FEC entries to absorb into a higher-level flattened FEC entry is a number great enough to cause the flattened FEC entry to have a height that is less than the MLI quantity.

In Step 308, a determination is made whether the flattened FEC entry (i.e., the hardware programming entry) requires any adjustments. In one or more embodiments, when adding the contents of each lower-level FEC to a flattened FEC entry, it may be necessary to make additional adjustments, rather than merely appending additional forwarding behaviors. Such additional adjustments may be considered part of the FEC flattening action set. In one or more embodiments, if an adjustment is required, the method proceeds to Step 310. In one or more embodiments, if no adjustments are needed, the method proceeds to Step 312.

In Step 310, any necessary adjustments are made to the flattened FEC entry. One example of such an adjustment is if a primary (i.e., higher-level) FEC and secondary (i.e., lower-level) FEC both instruct MPLS label(s) to be pushed onto a packet. In such an example, the MPLS labels must then be merged into a single action to push the combined set of labels. Such a merge may be referred to as an adjustment.

In Step 312, a hardware programming entry is generated that represents the flattened FEC entry. In one or more embodiments, a hardware programming entry is information in any form that may be used to directly or indirectly program the flattened FEC entry to hardware. For example, the programming of a given hardware component may be performed directly via a programming interface associated with the hardware components. In such an example, the hardware programming entry will be in whatever form is required to be used by the programming interface to program the hardware component. In one or more embodiments, performing a FEC hierarchy action set results in the generation of FEC hardware programming entries for use in programming the flattened FEC hierarchy to one or more hardware components of a network device (as discussed in the description of Step 216 of FIG. 2, above) so long as the flattened FEC hierarchy has not been marked as invalid.

In Step 314, a determination is made whether programming the flattened FEC hardware programming entry to hardware is unnecessary. In one or more embodiments of the invention, such a determination is made by checking that whether the flattened FEC entry has a height that is supported by the hardware component, and that the FEC entry is not directly referenced, for example, by any route. If the FEC entry has a supported height, but is not referenced by anything other than another FEC into which the information of the FEC entry was absorbed, programming the FEC entry is unnecessary. In one or more embodiments, if the entry is unneeded, the method proceeds to Step 314. In one or more embodiments, if the entry should be programmed to hardware, the method returns to Step 304.

In Step 316, the unneeded entry is not programmed, thereby preventing the programming of an unnecessary entry to the hardware. In one or more embodiments, preventing FECs which appear in a hierarchy, but are never required as separate entries in hardware, from being programmed, is achieved by not creating a hardware programming entry for such a FEC. In other embodiments, such prevention occurs via deletion of a generated hardware programming entry for the unnecessary FEC. In one or more embodiments, such prevention is achieved by marking in some way the hardware programming entry for the FEC as not-to-be programmed. In one or more embodiments, such prevention may save resources in the hardware. For example, if a FEC entry for FEC B only exists as part of another FEC hierarchy entry, is not the largest height FEC in the hierarchy), and was absorbed into another higher-level FEC entry for FEC A, then, during flattening, FEC B should not be installed, as it is not required.

In one or more embodiments, the technique for performing a FEC hierarchy flattening action set may be referred to as a top-down flattening technique. As an example, a top-down flattening technique may be illustrated by a portion of a FEC hierarchy in which [FEC A→ FEC B→ FEC C→ egress interface] is being flattened into [FEC AB' → FEC C], where B' represents that any actions or information associated with FEC B in the hierarchy are added to a hardware programming entry for FEC A. Such top-down flattening may be in contrast to "bottom-up" flattening, which would result in FEC A→ FEC BC', where the egress port information associated with FEC C is added to a hardware programming entry for FEC B.

In one or more embodiments, using a top-down flattening technique is useful, because of an assumption that in a real application of FEC hierarchies, the bottom-level, or leaf, FECs may be less numerous, and may be more commonly shared (i.e., pointed to by a greater number of higher-level FECs). As an example, leaf FEC entries may include FECs representing immediate neighbors of a router, which may be less numerous compared to remote neighbors, and which may be very numerous, but resolve over one or more of the immediate neighbors. In one or more embodiments, if more FECs can be shared (as part of a hierarchy) when installed in the hardware, FEC entry resources requirements in the hardware may be lessened, which may improve scale capabilities.

In one or more embodiments, preventing the unnecessary programming of certain FEC entries, as discussed above in the description of Steps 314 and 316, is possible due to the use top-down flattening, since top-down flattening may guarantee that any FEC entry will have a known height when it is to be installed as part of any hierarchy. For example, where FEC A→FEC B→FEC C→egress port is installed as FEC AB'→FEC C, and FEC B→C, FEC B (or anything which has absorbed FEC B) will always have height of one and point to FEC C, and therefore FEC C will always be installed. The converse may not be true with bottom-up flattening. In the previous example, bottom-up flattening would yield FEC A→FEC BC' and FEC B→FEC C. Here, FEC C is only needed as a separate entry if FEC B is directly referenced by at least one route, so the bottom-up flattening logic is not able to predict if FEC C will need to be installed as part of any FEC hierarchies that FEC C is part of before FEC B and FEC A have themselves been evaluated.

Figure 4:
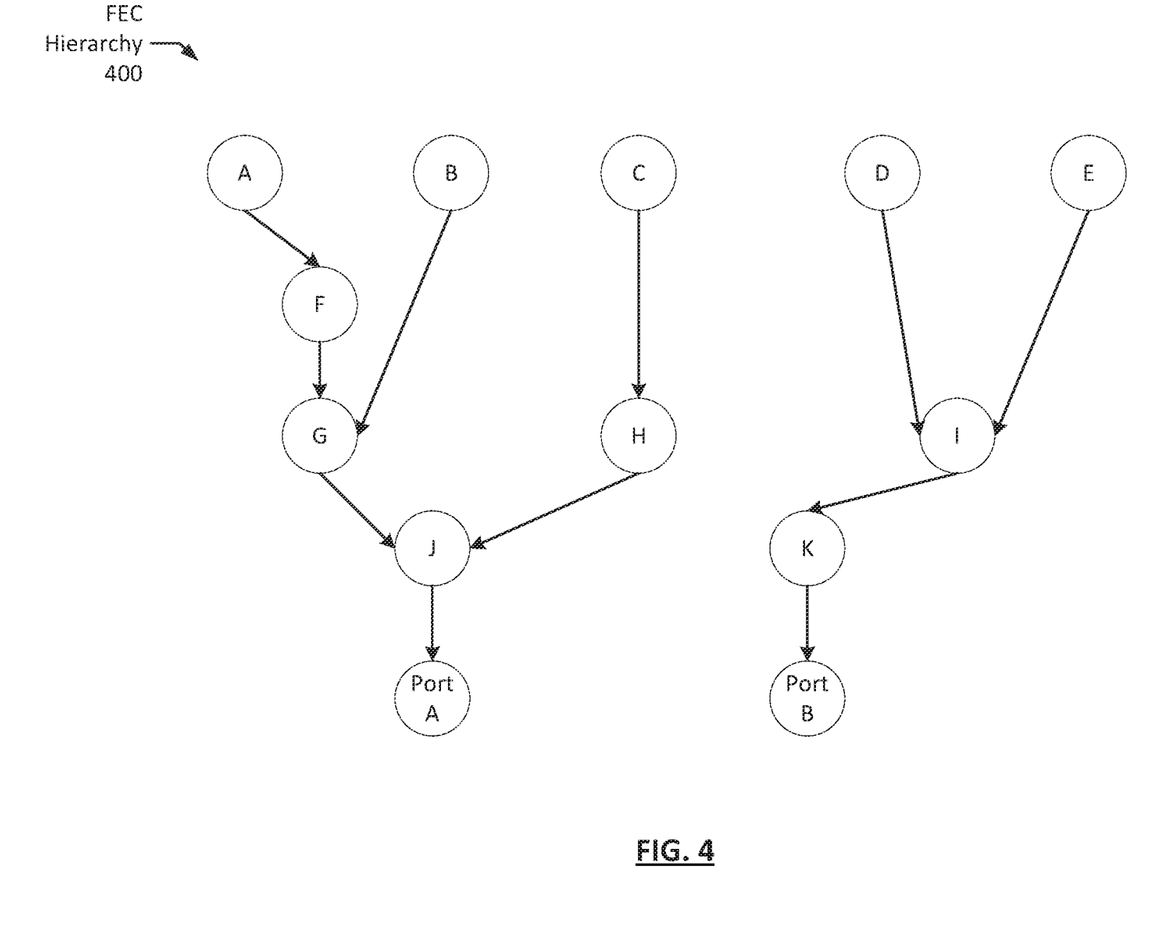
FIGS. 4-5 show an example in accordance with one or more embodiments described herein.
Figure 5:
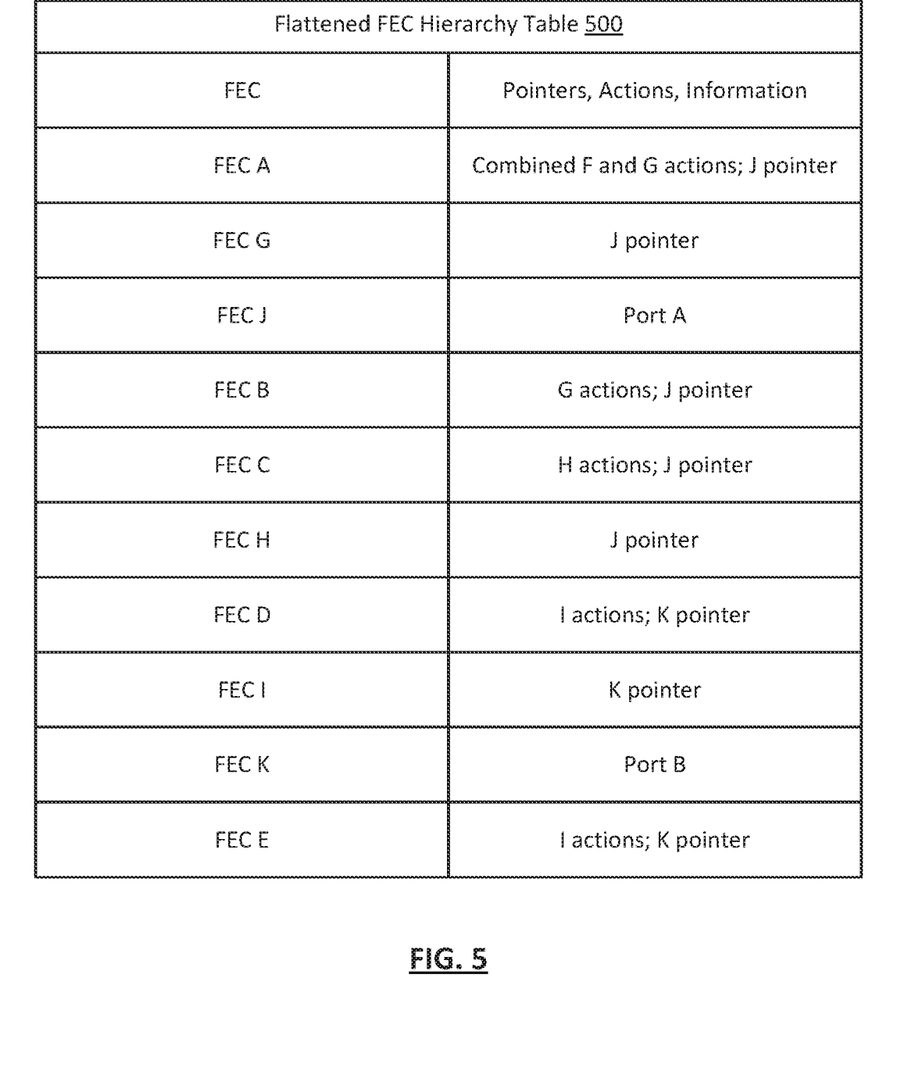

FIGS. 4-5 show an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIGS. 4-5, consider a scenario in which a FEC hierarchy provider stores a FEC hierarchy (400) in memory shared with a FEC hierarchy manager that the FEC hierarchy provider desires to be programmed into a hardware component of a network device. The FEC hierarchy manager obtains FEC hierarchy (400) from the shared memory.

To determine the hierarchy height, the FEC hierarchy manager starts with the leaf nodes for FEC J, which indicates that network traffic data units that fall within either FEC should be forwarded from port A, and FEC K, which indicates that network traffic data units that fall within either FEC should be forwarded from port B, and thus do not represent any levels of indirection within the FEC hierarchy. By following the edges from the leaf nodes to the highest level nodes in FEC hierarchy (400), the FEC hierarchy manager determines that the path from FEC A→FEC F→FEC G→FEC J→port A includes the most levels of indirection of any path in the hierarchy, which is three levels of indirection, A to F, F to G, and G to J.

Next, the FEC hierarchy manager checks a network device storage location to determine that the hardware component to which FEC hierarchy (400) is to be programmed only supports one layer of indirection, meaning the hardware component supports an MLI quantity of up to one. Accordingly, because the hierarchy height of FEC hierarchy (400) is greater than the MLI quantity for the hardware component, a FEC hierarchy flattening action set must be performed.

The FEC hardware manager may start with FEC A. Specifically, a hardware programming entry may be created for FEC A that includes a pointer to FEC J, along with any actions or information included in the entries of FEC hierarchy (400) for FEC F and FEC G, resulting in a hardware programming entry that includes FEC AF'G'→J.

Keeping with the same branch of the FEC hierarchy (400), the FEC hierarchy manager then creates a hardware programming entry for FEC F that includes a pointer to FEC J along with any actions or information included in the entries of FEC hierarchy (400) for FEC G. Additionally, a hardware programming entry for FEC G is generated that includes a pointer to FEC J. Next, a hardware programming entry is generated for FEC J that indicates that network traffic data units should be forwarded from port A.

Next, the FEC hierarchy manager assesses FEC B, and generates a hardware programming entry for FEC B that includes a pointer to FEC J along with any actions or information included in the entries of FEC hierarchy (400) for FEC G.

Next, the FEC hierarchy manager assesses FEC C, and generates a hardware programming entry for FEC C that includes a pointer to FEC J along with any actions or information included in the entries of FEC hierarchy (400) for FEC H. Additionally, a hardware programming entry for FEC H is generated that includes a pointer to FEC J.

Next, the FEC hierarchy manager assesses FEC D, and generates a hardware programming entry for FEC D that includes a pointer to FEC K along with any actions or information included in the entries of FEC hierarchy (400) for FEC I. Additionally, a hardware programming entry for FEC I is generated that includes a pointer to FEC K. Next, a hardware programming entry is generated for FEC K that indicates that network traffic data units should be forwarded from port B.

Next, the FEC hierarchy manager assesses FEC E, and generates a hardware programming entry for FEC E that includes a pointer to FEC K along with any actions or information included in the entries of FEC hierarchy (400) for FEC I.

Next, the FEC hierarchy manager determines that the FEC F node and the FEC G node both indicate that a MPLS label should be pushed onto a network traffic data unit. Accordingly, the actions are combined into a single action to push a combined MPLS label onto a network traffic data unit, which would be performed for any network data traffic unit within FEC A.

Next, the FEC hierarchy manager determines that no routes point to FEC F, and that FEC F was absorbed into the entry for FEC A during the flattening process. Accordingly, the FEC hierarchy manager will not program an entry for FEC F to the hardware component.

A table representing the various flattened FEC hierarchy hardware programming entries is shown in FIG. 4 as a flattened FEC hierarchy table (500), in which no entry represents a number of levels of indirection that is greater than one, which is the MLI quantity supported by the hardware component. Specifically, the entries for FECs A, G, B, C, H, D, I, and E have a height of one, and the entries for FECs J and K have a height of zero.

Next, flattened FEC hierarchy table (500) is programmed to the hardware component via a programming interface associated with the hardware component. The entries for FEC J and FEC K are programmed first, and entries for FECs successively higher in FEC hardware are programmed next. The programming order may ensure that each hardware programming entry, if it points to another entry, points to another entry that already exists, which may avoid issues attempting to program entries that point to other not-yet-existing entries.

Sometime later, FEC J is modified by the FEC hierarchy provider to indicate that network traffic data units should be forwarded from port C rather than port A. Accordingly, the FEC hierarchy manager causes the update to the hardware programming entry for FEC J. However, because of the top-down flattening scheme used by the FEC hierarchy manager, none of the entries for FECs A, G, B, C, or H need to be updated.

While embodiments described herein have been described with respect to a limited number of embodiments, those skilled in the art, having benefit of this disclosure, will appreciate that other embodiments can be devised which do not depart from the scope of embodiments described herein as disclosed herein. Accordingly, the scope embodiments described herein should be limited only by the attached claims.

What is claimed is:

1. A method, comprising:
   obtaining a forwarding equivalence class (FEC) hierarchy;
   making a first determination that a first hardware component supports a maximum levels of indirection (MLI) quantity;
   making a second determination that the FEC hierarchy has a hierarchy height;
   based on the first determination and the second determination, performing a comparison between the MLI quantity and the hierarchy height to obtain a comparison result; and
   based on the comparison result, performing a FEC hierarchy action set.

2. The method of claim 1, wherein:
   the comparison result indicates that the hierarchy height is less than or equal to the MLI quantity, and
   the FEC hierarchy action set comprises programming the FEC hierarchy in a hardware component of a network device as an unflattened FEC hierarchy.

3. The method of claim 1, wherein:
   the comparison result indicates that the hierarchy height is greater than the MLI quantity, and
   the FEC hierarchy action set comprises performing a FEC hierarchy flattening action set to obtain a flattened FEC hierarchy.

4. The method of claim 3, wherein performing the FEC hierarchy flattening action set comprises:
   making a third determination that a leaf FEC entry of the FEC hierarchy has a first height less than the MLI quantity;
   based on the third determination, generating a first hardware programming entry comprising a leaf FEC for the leaf FEC entry and an egress interface;
   making a fourth determination that a higher-level FEC entry of the FEC hierarchy has a second height that is greater than the MLI quantity; and
   based on the fourth determination, generating a second hardware programming entry comprising a higher-level FEC of the higher-level FEC entry and a pointer to a lower-level FEC.

5. The method of claim 4, wherein the lower-level FEC is the leaf FEC.

6. The method of claim 3, wherein performing the FEC hierarchy flattening action set comprises:
making a third determination that a higher-level FEC entry of the FEC hierarchy has a height that is greater than the MLI quantity;
based on the third determination, generating a hardware programming entry comprising a higher-level FEC of the higher-level FEC entry, a first action, and a second action;
making a fourth determination that the first action and the second action are conflicting actions;
based on the fourth determination, marking the flattened FEC hierarchy as an invalid FEC hierarchy; and
based on marking the flattened FEC hierarchy as the invalid FEC hierarchy, not programming the invalid FEC hierarchy to a hardware component.

7. The method of claim 3, wherein performing the FEC hierarchy flattening action set comprises:
making a third determination that a higher-level FEC entry of the FEC hierarchy has a height that is greater than the MLI quantity;
based on the third determination, generating a hardware programming entry comprising a higher-level FEC of the higher-level FEC entry, a first action, and a second action;
making a fourth determination that the first action and the second action should be combined into a single action; and
based on the fourth determination, combining the first action and the second action into the single action.

8. The method of claim 3, further comprising:
making a third determination that the flattened FEC hierarchy has a flattened FEC hierarchy height;
storing the flattened FEC hierarchy height;
making a fourth determination that the flattened FEC hierarchy height is less than or equal to a second MLI quantity of a second hardware component; and
based on the fourth determination, programming the flattened FEC hierarchy to the second hardware component.

9. The method of claim 3, wherein performing the FEC hierarchy flattening action set further comprises:
making a third determination that a FEC entry of the FEC hierarchy has a height that is greater than the MLI quantity;
making a fourth determination that a FEC of the FEC entry is not pointed to by any protocol prefix; and
based on the third determination and the fourth determination, not generating a hardware programming entry comprising the FEC for the FEC entry.

10. The method of claim 3, wherein performing the FEC hierarchy flattening action set comprises performing a top-down flattening.

11. A non-transitory computer readable medium comprising instructions that, when executed by a processor, perform a method, the method comprising:
obtaining a forwarding equivalence class (FEC) hierarchy;
making a first determination that a first hardware component supports a maximum levels of indirection (MLI) quantity;
making a second determination that the FEC hierarchy has a hierarchy height;
based on the first determination and the second determination, performing a comparison between the MLI quantity and the hierarchy height to obtain a comparison result; and
based on the comparison result, performing a FEC hierarchy action set.

12. The non-transitory computer readable medium of claim 11, wherein:
the comparison result indicates that the hierarchy height is less than or equal to the MLI quantity, and
the FEC hierarchy action set comprises programming the FEC hierarchy in a hardware component of a network device as an unflattened FEC hierarchy.

13. The non-transitory computer readable medium of claim 11, wherein:
the comparison result indicates that the hierarchy height is greater than the MLI quantity, and
the FEC hierarchy action set comprises performing a FEC hierarchy flattening action set to obtain a flattened FEC hierarchy.

14. The non-transitory computer readable medium of claim 13, wherein performing the FEC hierarchy flattening action set comprises:
making a third determination that a leaf FEC entry of the FEC hierarchy has a first height less than the MLI quantity;
based on the third determination, generating a first hardware programming entry comprising a leaf FEC for the leaf FEC entry and an egress interface;
making a fourth determination that a higher-level FEC entry of the FEC hierarchy has a second height that is greater than the MLI quantity; and
based on the fourth determination, generating a second hardware programming entry comprising a higher-level FEC of the higher-level FEC entry and a pointer to a lower-level FEC.

15. The non-transitory computer readable medium of claim 14, wherein the lower-level FEC is the leaf FEC.

16. The non-transitory computer readable medium of claim 13, wherein performing the FEC hierarchy flattening action set comprises:
making a third determination that a higher-level FEC entry of the FEC hierarchy has a height that is greater than the MLI quantity;
based on the third determination, generating a hardware programming entry comprising a higher-level FEC of the higher-level FEC entry, a first action, and a second action;
making a fourth determination that the first action and the second action are conflicting actions;
based on the fourth determination, marking the flattened FEC hierarchy as an invalid FEC hierarchy; and
based on marking the flattened FEC hierarchy as the invalid FEC hierarchy, not programming the invalid FEC hierarchy to a hardware component.

17. The non-transitory computer readable medium of claim 13, wherein performing the FEC hierarchy flattening action set comprises:
making a third determination that a higher-level FEC entry of the FEC hierarchy has a height that is greater than the MLI quantity;
based on the third determination, generating a hardware programming entry comprising a higher-level FEC of the higher-level FEC entry, a first action, and a second action;

making a fourth determination that the first action and the second action should be combined into a single action; and based on the fourth determination, combining the first action and the second action into the single action.

18. The non-transitory computer readable medium of claim 13, further comprising:
making a third determination that the flattened FEC hierarchy has a flattened FEC hierarchy height;
storing the flattened FEC hierarchy height;
making a fourth determination that the flattened FEC hierarchy height is less than or equal to a second MLI quantity of a second hardware component; and
based on the fourth determination, programming the flattened FEC hierarchy to the second hardware component.

19. The non-transitory computer readable medium of claim 13, wherein performing the FEC hierarchy flattening action set further comprises:
making a third determination that a FEC entry of the FEC hierarchy has a height that is greater than the MLI quantity;
making a fourth determination that a FEC of the FEC entry is not pointed to by any protocol prefix; and
based on the third determination and the fourth determination, not generating a hardware programming entry comprising the FEC for the FEC entry.

20. The non-transitory computer readable medium of claim 13, wherein performing the FEC hierarchy flattening action set comprises performing a top-down flattening.

* * * * *